(12) United States Patent
Lee

(10) Patent No.: US 7,324,483 B2
(45) Date of Patent: Jan. 29, 2008

(54) PACKET DATA TRANSMITTING METHOD IN A CDMA MOBILE COMMUNICATION SYSTEM

(75) Inventor: Jung-Sup Lee, Kangnam-gu (KR)

(73) Assignee: Samsung Electronics Co., Ltd (KR)

( * ) Notice: Subject to any disclaimer, the term of this patent is extended or adjusted under 35 U.S.C. 154(b) by 1129 days.

(21) Appl. No.: 10/191,188

(22) Filed: Jul. 9, 2002

(65) Prior Publication Data

US 2003/0021256 A1  Jan. 30, 2003

(30) Foreign Application Priority Data

Jul. 9, 2001  (KR)  ................. 2001-40890

(51) Int. Cl.
*H04B 7/216* (2006.01)
(52) U.S. Cl. .............. 370/335; 370/342; 370/395.1
(58) Field of Classification Search ............ 370/335, 370/342, 395.1
See application file for complete search history.

(56) References Cited

U.S. PATENT DOCUMENTS

| 6,671,287 | B1* | 12/2003 | Huttunen et al. ........... 370/469 |
| 6,785,535 | B2* | 8/2004 | Lucidarme et al. ......... 455/406 |
| 7,027,826 | B2* | 4/2006 | Mizell et al. .............. 455/466 |
| 7,035,287 | B2* | 4/2006 | Tourunen et al. .......... 370/477 |
| 7,054,945 | B2* | 5/2006 | Hurtta et al. .............. 709/230 |
| 2003/0012133 | A1* | 1/2003 | Jappinen ................... 370/225 |

* cited by examiner

*Primary Examiner*—Brian Nguyen
(74) *Attorney, Agent, or Firm*—The Farrell Law Firm, PC

(57) ABSTRACT

To simplify a protocol structure for a packet data service in a CDMA mobile communication system, an ATM protocol is used for communication between an SGSN and a GGSN and a downlink TEID and an uplink TEID are assigned to an RNC and the GGSN and thereby, GTP tunnels are integrated into one GTP tunnel.

12 Claims, 6 Drawing Sheets

PACKET DATA TRANSMITTING METHOD IN A CDMA MOBILE COMMUNICATION SYSTEM

PRIORITY

This application claims priority to an application entitled "Packet Data Transmitting Method in a CDMA Mobile Communication System" filed in the Korean Industrial Property Office on Jul. 9, 2001 and assigned Serial No. 2001-40890, the contents of which are hereby incorporated by reference.

BACKGROUND OF THE INVENTION

1. Field of the Invention

The present invention relates generally to a method of providing a packet data service in a CDMA (Code Division Multiple Access) mobile communication system, and in particular, to a method of simplifying a protocol structure for packet data service.

2. Description of the Related Art

A mobile communication system is a generic term indicating a system that services voice and data over a wireless network. Mobile communication systems can be categorized according to multiple access methods. A major example is CDMA. The CDMA mobile communication system has evolved from IS-95 that focuses on voice communication to IMT-2000 that additionally provides high rate data transmission. The IMT-2000 system aims at high quality voice transmission, moving picture transmission, Internet browsing, etc.

Various proposals have been made to service voice and data in mobile communication systems. A circuit switched network and a packet switched network are among them. A network structure that allows efficient information transmission should be considered in designing a mobile communication network. This demand will be pressing in the future generation mobile communication system because the increase in the amount of data to be transmitted will be soaring along with the demand for various services.

FIG. 1 illustrates the configuration of a network in a typical CDMA mobile communication system for servicing packet data. Referring to FIG. 1, an MS (Mobile Station) 100 is connected to a UTRAN (Universal mobile telecommunication service Terrestrial Radio Access Network) 102. The UTRAN 102 is connected to a core network including SGSNs (Serving General packet radio service Supporting Nodes) 112a and 112b and GGSNs (Gateway GSNs) 118a and 118b. A connection is made between the UTRAN 102 and the SGSNs 112a and 112b over ATM (Asynchronous Transfer Mode)-layer 2, but no particular protocol is defined for connection between the SGSNs 112a and 112b and the GGSNs 118a and 118b. Layer 3 uses IP (Internet Protocol) commonly for communications between the UTRAN 102 and the SGSNs 112a and 112b and between the SGSNs 112a and 112b and the GGSNs 118a and 118b. The GGSNs 118a and 11 8b are nodes that connect the network to the Internet and manage the IP addresses of GPRS users. An SGSN that a particular MS is connected to is detected according to the IP address of the MS. The SGSNs 112a and 112b are nodes that service the MS 100 and set a PDP (Packet Data Protocol) environment with the GGSNs 118a and 118b and the UTRAN 102. The UTRAN 102 is a logical entity including a plurality of RNCs (Radio Network Controllers) 103a, 103b and 103c for assigning and controlling radio resources.

The MS must establish a connection with the GGSNs 118a and 118b to receive a packet service in the CDMA mobile communication system. To do so, a GTP (GPRS Tunneling Protocol) tunnel must be established between the UTRAN 102 and the GGSNs 118a and 118b. The GTP tunnel is divided into a first GTP path between the UTRAN 102 and the SGSNs 112a and 112b and a second GTP path between the SGSNs 112a and 112b and the GGSNs 118a and 118b. Each GTP path is identified usually by a TEID (Tunnel Endpoint ID). The SGSNs 112a and 112b relay a GTP packet provided through the UTRAN 102 to the GGSNs 118a and 118b according to the TEID.

Though not separately depicted in FIG. 1, a control path and a data path (GTP path) for packet transmission are defined distinctively between the MS 100 and the GGSNs 118a and 118b. Therefore, the core network establishes the data path by processing control messages transmitted in the control path and packet data is transmitted in the data path.

A layered protocol structure for the CDMA mobile communication system is illustrated in FIG. 2. Referring to FIG. 2, the network elements of the core network are based on IP. The IP is different from IP in a higher layer. For example, when the MS 100 conducts IP communications, the IP of the MS 100 is at the same layer as the IP of the GGSNs 118a and 118b. This is also applied to the UTRAN 102 and the SGSNs 112a and 112b. Then the network has two IP layers. In the lower IP layer, PTP (Packet Transfer Protocol) UDP (User Datagram Protocol) connections are established for the first GTP path between the UTRAN 102 and the SGSNs 112a and 112b and for the second GTP path between the SGSNs 112a and 112b and the GGSNs 118a and 118b. Layer 1/layer2 between the UTRAN 102 and the SGSNs 112a and 112b is defined to be ATM/AAL5. No particular connection protocols are defined for layer 1 and layer 2 between the SGSNs 112a and 112b and the GGSNs 118a and 118b. GTP operates over UDP.

For packet communication for the MS 100, a GTP tunnel must be established between the MS 100 and a GGSN (118a or 118b) through PDP session activation. This is called a PDP setup and a control message for GTP tunneling is a GTP-C. While PDP session activation varies according to what entity requests it, the following description is made with the appreciation that the MS 100 requests it.

FIG. 3 illustrates a signal flow for a PDP setup upon request from the MS in a conventional CDMA mobile communication system. Steps 301 to 311 relate to establishing a data path by control messages transmitted in a control path and steps 313 to 319 relate to transmission of packet data in the data path.

Referring to FIG. 3, the MS 100 sets a desired QoS (Quality of Service) and transmits to the SGSN (112a or 112b) an Activate PDP Context Request message containing the QoS in step 301. The SGSN sets TEID 1, a QoS, and an SGSN IP address (SG-IP) and transmits a Radio Access Bearer (RAB) Assignment Request message containing the information for the Activate PDP Context Request message to a serving RNC among the RNCs 103a, 103b and 103c of the UTRAN 102 in step 303. TEID 1 identifies a path in which the SGSN transmits the packet to the RNC. That is, the SGSN attaches TEID 1 to the header of the packet so that the RNC can determine from TEID 1 that the packet is from the SGSN. The SG-IP is the IP address of the SGSN and the QoS is a QoS that the SGSN supports.

The RNC sets TEID 2, a QoS, and an RNC IP address (RN-IP) and transmits an RAB Assignment Response message to the SGSN in step 305. TEID 2 indicates a path in which the RNC transmits a packet to the SGSN. That is, the RNC attaches TEID 2 to the header of the packet so that the SGSN can determine from TEID 2 that the packet data is from the RNC. The RN-IP is the IP address of the RNC and the QoS is a QoS that the RNC supports. Thus a GTP tunnel has been established between the RNC and the SGSN.

Meanwhile, the SGSN generates TEID 3 and a QoS and transmits to the GGSN a Create PDP Context Request message including TEID 3 and the QoS in response for the Activate PDP Context Request message received from the MS 100 in step 307. TEID 3 indicates a path in which the SGSN transmits a packet to the GGSN. That is, the SGSN attaches TEID 3 to the header of the packet so that the GGSN can determine from TEID 3 that the packet is destined for the GGSN. The QoS is a QoS that the SGSN supports for the GGSN.

In step 309, the GGSN sets TEID 4 and a QOS and transmits to the SGSN a Create PDP Context Response message including TEID 4 and the QoS for the Create PDP Context Request message. TEID 4 indicates a path in which the GGSN transmits a packet to the SGSN. That is, the GGSN attaches TEID 4 to the header of the packet so that the SGSN can determine from TEID 4that the packet is destined for the SGSN. The QoS is a QoS that the GGSN supports for the SGSN.

The SGSN transmits an Activate PDP Context Accept message including a QoS available in the current network to the MS 100 in step 311.

After the setup procedure, the SGSN is capable of routing a PDP PDU (Packet Data Unit) between the MS 100 and the GGSN, that is, a communication is possible between the MS 100 and the GGSN.

The MS 100 transmits a PDP PDU to the RNC and the RNC forwards the PDP PDU to the SGSN by TEID 1. The SGSN then routes the PDP PDU to the GGSN by TEID 4.

Meanwhile, the GGSN transmits a PDP PDU to the SGSN by TEID 3 and the SGSN routes the PDP PDU to the RNC by TEID 2. The RNC forwards the PDP PDU to the MS 100. The GTP path for packet transmission is marked with a dotted line in FIG. 4.

Despite the advantage of the convenience of using an IP in the lower network, the following problems are generated in interfacing between the lower protocol layer and the higher protocol layer in the GTP path.

(1) The GTP path from the RNC to the GGSN passes through five protocol layers, which may cause problems with performance;

(2) A QoS profile requested at each GTP path is not ensured in the course of passing through the IP/UDP/GTP protocol layers of the SGSN. That is, congestion at the SGSN may adversely affect each tunnel; and (3) While ATM protocols are adopted for the whole UTRAN-SGSN-GGSN path, a QoS set in the RNC or GGSN is not ensured during packet routing in the SGSN because the ATM channel terminates at the SGSN and all packet data are handled equally.

The reasons for these problems are that different lower layer protocols may be applied between the RNC and the SGSN and between the SGSN and GGSN and UDPs connected to the RNC and the GGSN are terminated at the SGSN. That is, IP/UDP termination occurs to received data, followed by a change of a GTP TEID and UDP/IP transmission in the SGSN. Logically two-layer switching occurs over UDP/IP.

SUMMARY OF THE INVENTION

It is, therefore, an object of the present invention to provide a simplified layered protocol architecture for packet data transmission.

It is another object of the present invention to provide a packet data format that simplifies a layered protocol architecture for packet data transmission.

It is a further object of the present invention to provide a method of simplifying establishment of a packet data transmission path for packet service.

To achieve the above and other objects, an SGSN requests from the RNC a TEID identifying an uplink packet data path upon receipt from the packet data service request from an MS. The RNC assigns a first TEID to the SGSN. The SGSN assigns to the GGSN the first TEID and a first ATM VCC (Virtual Channel Connection) for data transmission from the GGSN to the SGSN. The GGSN assigns to the SGSN a second TEID and a second ATM VCC for data transmission from the SGSN to the GGSN. The SGSN assigns to the RNC the second TEID and a third ATM VCC for data transmission from the RNC to the SGSN. The RNC assigns to the SGSN a fourth ATM VCC for data transmission from the SGSN to the RNC.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The following description of the present invention is made on the assumptions that a modified PDU format is used for a PDP context activation procedure, the PDP context activation is initiated by an MS, and other secondary PDPs are not considered.

"Cut Through Tunneling" is proposed in the embodiment of the present invention. The basic concept of the Cut Through Tunneling is integration of two GTP paths between an RNC and an SGSN and between the SGSN and a GGSN into one GTP path. That is, the GTP paths are directly mapped to ATM VCCs (Virtual Channel Connections).

Therefore, data from the RNC and the GGSN is transmitted at high speed to the other party via the ATM VCC established between the RNC and the GGSN without passing through the IP/UDP/GTP layers of the SGSN. For this purpose, an ATM VCC is directly set up between the RNC and the GGSN instead of setting separate ATM VCCs between the RNC and the SGSN and between the SGSN and the GGSN. In the case of not using the Cut Through Tunneling, the RNC and the GGSN forward packet data using TEIDs assigned by the SGSN. On the other hand, in the case of using the Cut Through Tunneling, a transmitter transmits TEIDs because TEID conversion is impossible in the SGSN.

For PDP context activation to implement the Cut Through Tunneling according to the embodiment of the present invention, two messages are added to the conventional messages used in the conventional PDP context activation, and each of two of the conventional messages has one additional field.

Figure 1:
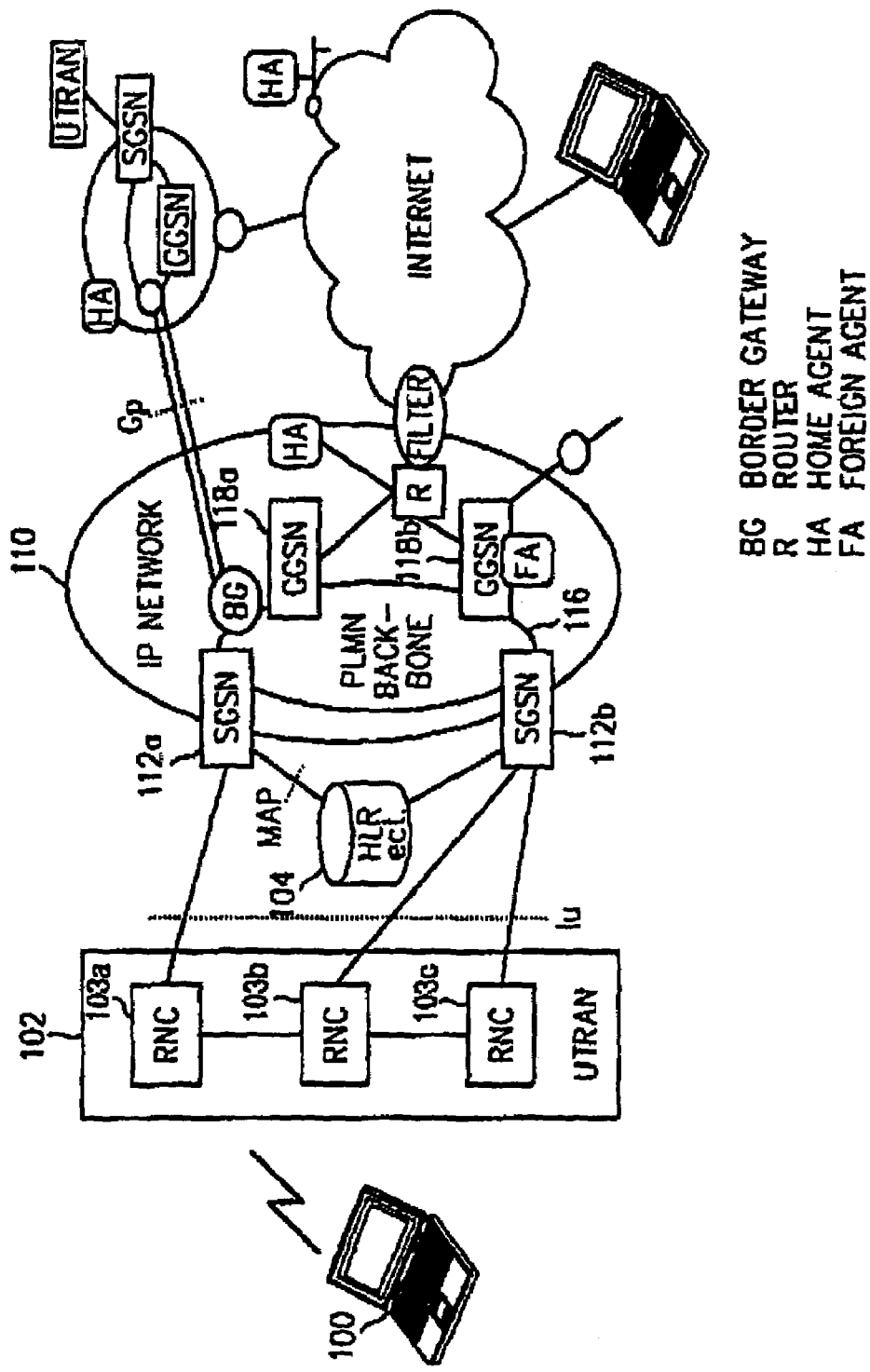
FIG. 1 illustrates a network configuration for packet data service in a typical CDMA mobile communication system.
Figure 2:
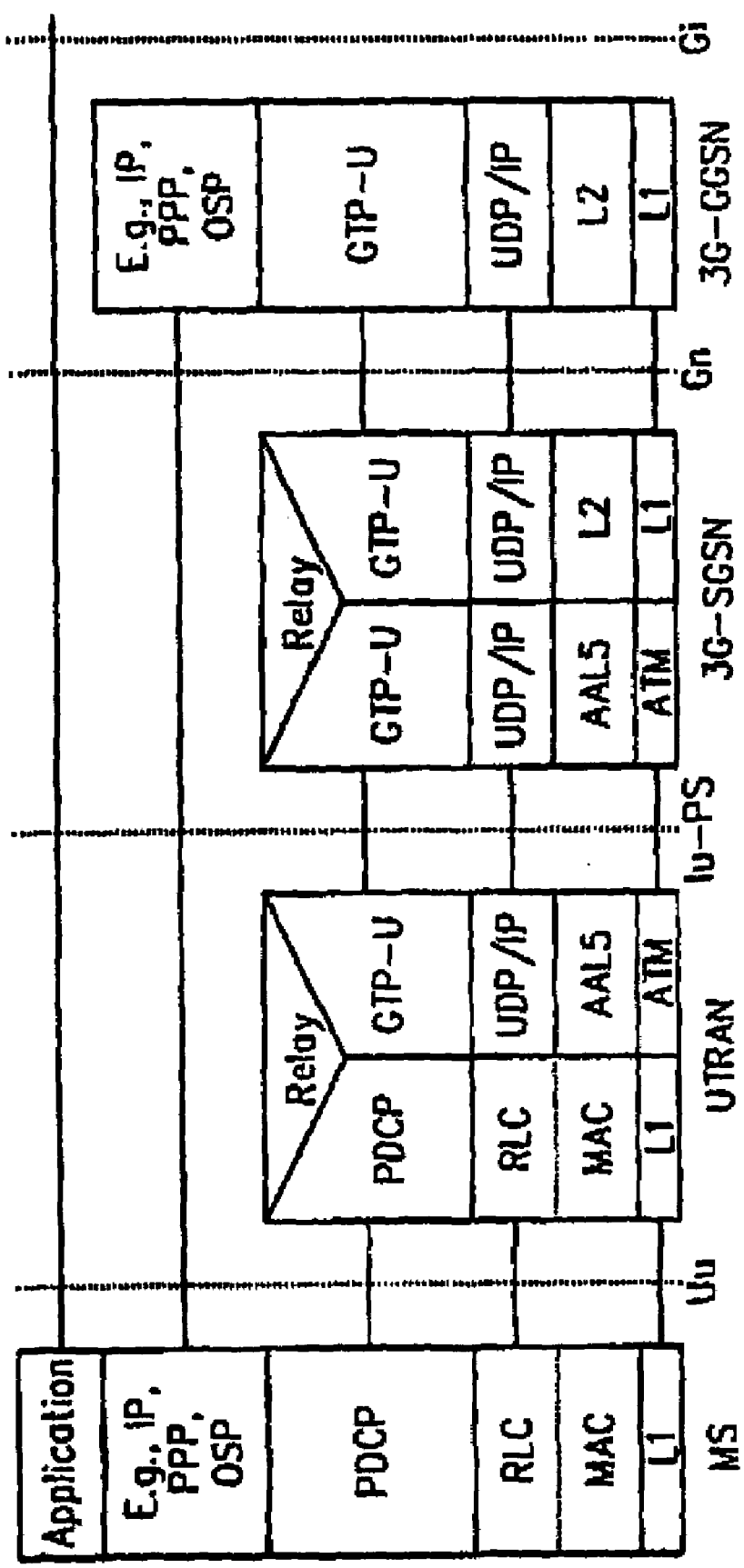
FIG. 2 illustrates a layered protocol architecture for network elements illustrated in FIG. 1.
Figure 3:
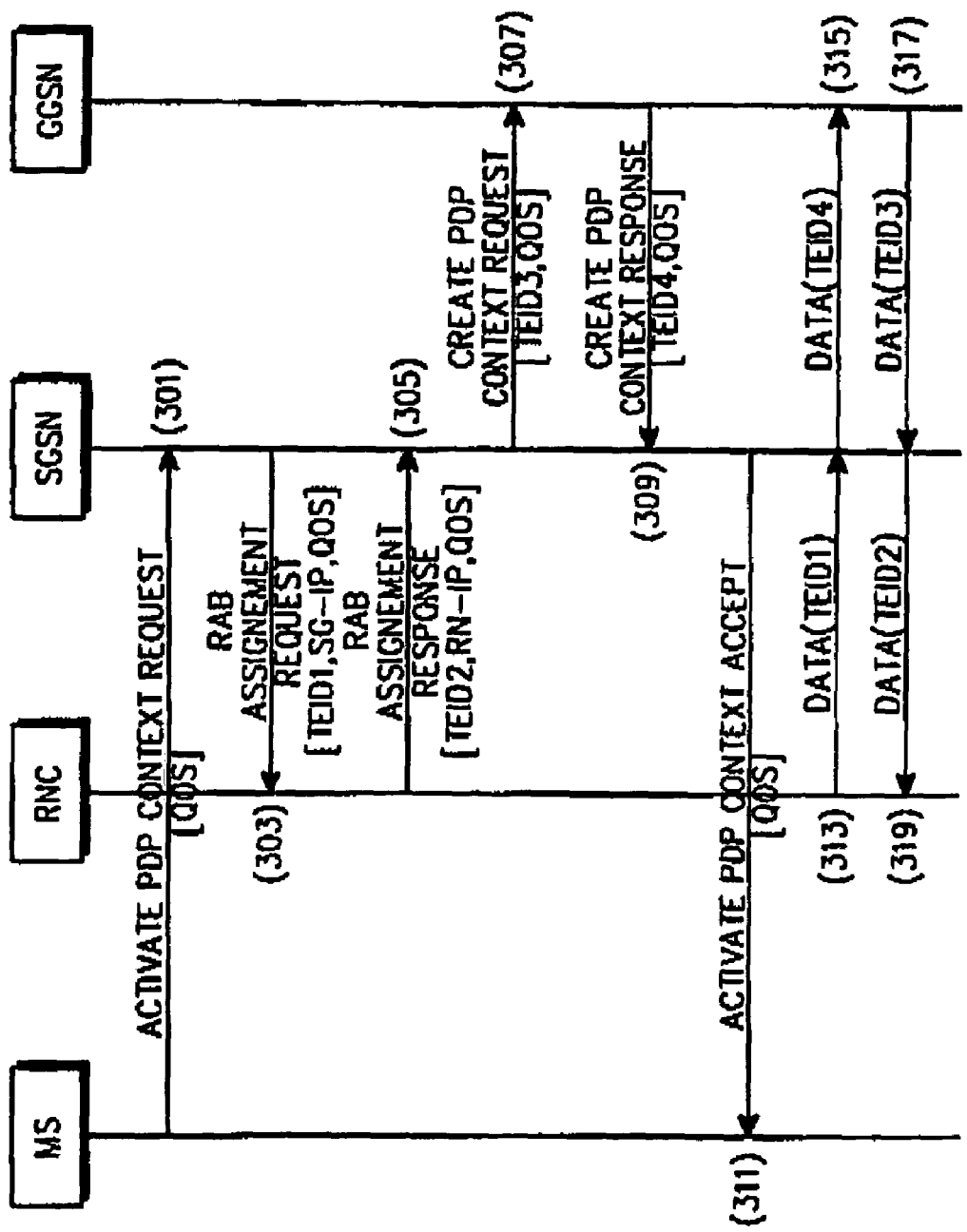
FIG. 3 is a diagram illustrating a signal flow for providing a packet data service in a conventional CDMA mobile communication system.
Figure 4:
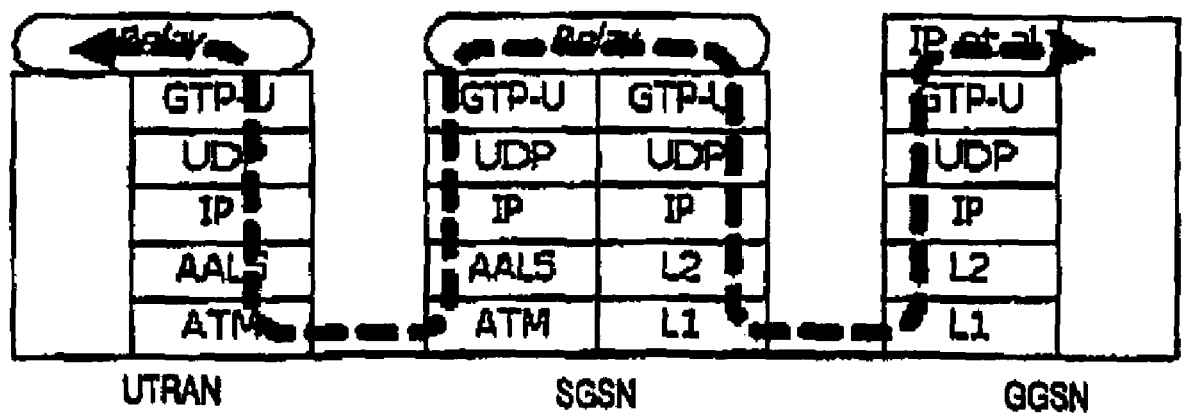
FIG. 4 is a layered protocol architecture in each element for the packet data service in the conventional CDMA mobile communication system.
Figure 5:
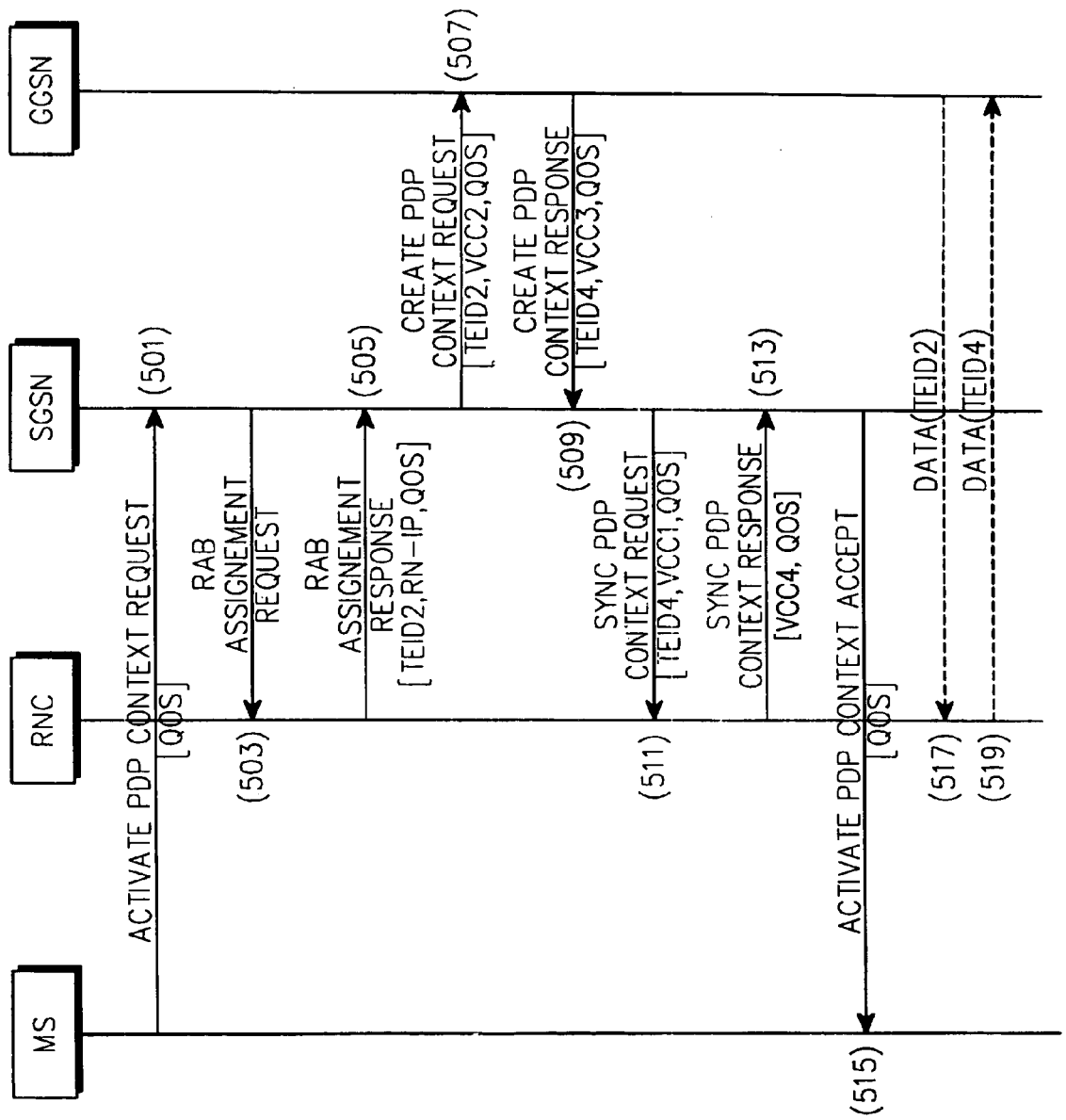
FIG. 5 is a diagram illustrating a signal flow for providing a packet data service in a CDMA mobile communication system according to an embodiment of the present invention.

FIG. 5 illustrates a signal flow for PDP setup upon request from an MS in a CDMA mobile communication system according to the embodiment of the present invention. Steps 501 to 513 relate to data path setup by control messages transmitted in a control path and steps 515 to 517 relate to packet data transmission in the data path.

The main feature of a packet data service according to the embodiment of the present invention is that the same uplink TEID and the same downlink TEID are used to establish data paths between an RNC and an SGSN and between the SGSN and a GGSN. That is, when transmitting packet data from the RNC to the GGSN, the same TEID is used for the paths between the RNC and the SGSN and between the SGSN and the GGSN. On the other hand, when transmitting packet data from the GGSN to the RNC, the same TEID is used for the paths between the GGSN and the SGSN and between the SGSN and the RNC.

Yet, a different ATM VCC is assigned to each GTP path. That is, different VCCs are established for the paths from the RNC to the SGSN, from the SGSN to the GGSN, from the GGSN to the SGSN, and from the SGSN to the RNC.

Figure 6:
FIG. 6 is a layered protocol architecture in each element for the packet data service in the CDMA mobile communication system according to the embodiment of the present invention.

FIG. 6 is a diagram illustrating a data path (shown by the dotted line) for packet data transmission according to the embodiment of the present invention. As illustrated in FIG. 6, packet data is transmitted passing through only the ATM layer of the SGSN.

The following description will be made on the premise that the GGSN uses an ATM protocol. Referring to FIG. 5, the MS 100 determines a desired QoS and transmits to the SGSN an Activate PDP Context Request message including the QoS in step 501. The SGSN transmits to the RNC that covers the MS 100 an RAB Bearer Assignment Request for the Activate PDP Context Request message in step 503.

In step 505, the RNC sets TEID 2, a QoS, and an RN-IP and transmits a Radio Access Bearer Assignment Response message including the information to the SGSN. TEID 2 identifies a path in which the RNC transmits a packet to the GGSN via the SGSN. That is, the RNC attaches TEID 2 to the header of the packet data so that the GGSN can determine from TEID 2 that the packet data is from the RNC. The RN-IP is the IP address of the RNC and the QoS is a QoS that the RNC supports.

The SGSN then determines VCC2 as a VCC for establishing a data path with the GGSN and transmits to the GGSN a Create PDP Context Request message including VCC2, TEID 2, and a QoS in step 507. TEID 2 indicates a path in which the RNC transmits a packet to the GGSN as stated before. That is, the RNC attaches TEID 2 to the header of the packet data so that the GGSN can determine that the packet data is destined for the GGSN. VCC2 is for the path between the SGSN and the GGSN using an ATM protocol. That is, the SGSN transmits packet data to the GGSN by VCC2 and upon receipt of the packet data, the GGSN can determine that the packet data is from the SGSN. The QoS is a QoS that the SGSN can support for the GGSN.

The GGSN determines TEID 4 that identifies a data path from the GGSN to the RNC via the SGSN in response for the Create PDP Context Request message and determines VCC3 for the path from the GGSN to the SGSN.

In step 509, the GGSN transmits to the SGSN a Create PDP Context Response message including TEID 4, VCC 3 and a QoS. TEID 4 indicates a path in which the GGSN transmits a packet to the RNC via the SGSN. That is, the GGSN attaches TEID 4 to the header of the packet data so that the RNC can determine from TEID 4 that the packet data is destined for the RNC. The QoS is a QoS that the GGSN can support for the SGSN.

The SGSN determines VCC1 for a data path from the SGSN to the RNC and transmits a Sync PDP Context Request message including VCC1 and a QoS to the RNC in step 511. VCC1 is used for the path from the SGSN to the UTRAN. That is, the SGSN transmits packet data to the RNC by VCC1 and upon receipt of the packet data, the RNC recognizes that the packet data is from the SGSN from VCC1. The QoS is a QoS that the SGSN supports for the RNC.

The RNC determines VCC4 for a data path from the RNC to the SGSN in response for the Sync PDP Context Request message and transmits to the SGSN a Sync PDP Context Response message including VCC4 and a QoS in step 513. That is, the RNC transmits packet data to the SGSN by VCC4 and upon receipt of the packet data, the SGSN recognizes from VCC4 that the packet data is from the RNC. The QoS is a QoS that the RNC supports for the SGSN.

After the above data path setup procedure, the SGSN transmits to the MS 100 an Activate PDP Context Accept message containing a QoS available in the current network. Then the MS 100 transmits packet data via the established data paths.

The MS 100 transmits a PDP PDU to the RNC and the RNC forwards the PDP PDU to the SGSN by TEID 4 and VCC1. The SGSN then routes the PDP PDU to the GGSN by VCC 3. That is, the SGSN forward packet data received from the RNC to the GGSN with TEID 4 maintained and VCC updated. The use of the same TEID for each data path for transmission of packet data from the MS 100 to the GGSN obviates the TEID conversion procedure. Therefore, the SGSN simply updates the VCC of packet data received in the ATM layer.

Meanwhile, the GGSN transmits packet data to the SGSN by TEID 2 and VCC2. Then the SGSN forwards the packet data to the RNC by VCC4. That is, the SGSN maintains the TEID and updates the VCC set in the packet data received from the GGSN in routing the packet data to the RNC. The use of the same TEID for each data path for transmission of packet data from the GGSN to the MS 100 obviates the TEID conversion procedure. Therefore, the SGSN simply updates the VCC of packet data received in the ATM layer. The GTP path in which packet data is delivered according to the embodiment of the present invention is marked with a dotted line in FIG. 6. As illustrated in FIG. 6, the SGSN simply routes received packet data to the GGSN without any additional processing.

In accordance with the present invention as described above, packet data is transmitted at high speed between an RNC and a GGSN via ATM VCCs established between them without processing in the IP/UDP/GTP layers of an SGSN, thereby increasing data transmission and reception performance. Furthermore, ATM cell (packet data) switching occurs in the ATM layer of the SGSN and thus a QoS for packet data transmission set in the RNC or the GGSN is ensured until the QoS is delivered to the other node.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of providing a packet data service upon request from an MS (Mobile Station) in a core network including an RNC_(Radio Network Controller), an SGSN (Serving General packet radio service Supporting Node), and a GGSN_(Gateway GPRS Supporting Node) of a mobile communication system, comprising the steps of:
   transmitting a request message for the packet data service to the core network;
   assigning a GTP (GPRS Tunneling Protocol) path for transmitting the packet data;
   assigning an uplink TEID (Tunnel Endpoint ID) for a packet data transmission from the RNC to the GGSN via the SGSN and a downlink TED for a packet data transmission from the GGSN to the RNC via the SGSN the uplink TED and the downlink TED being identical; and
   assigning for data transmission a first VCC (virtual Channel connection) from the GGSN to the SGSN, a second VCC from the SGSN to the GGSN, a third VCC from the RNC to the SGSN, and a fourth VCC from the SGSN to the RNC, wherein at least one VCC is different from the remaining VCCs within the core network.

2. A method of establishing ATM (Asynchronous Transfer Mode) packet data paths via control paths between an RNC (Radio Network Controller) and an SGSN (Serving General packet radio service Supporting Node) and between the SGSN and a GGSN (Gateway GPRS Supporting Node) upon a packet data service request from an MS (Mobile Station) in a core network of a CDMA (Code Division Multiple Access) mobile communication system, the method comprising the steps of:
   requesting from the RNC a TEID (Tunnel Endpoint ID) identifying an uplink packet data path by the SGSN upon receipt of the packet data service request from the MS;
   assigning by the RNC a first TEID to the SGSN;
   assigning by the SGSN to the GGSN the first TEID and a first ATM VCC (Virtual Channel Connection) for data transmission from the GGSN to the SGSN;
   assigning by the GGSN to the SGSN a second TEID and a second ATM VCC for data transmission from the SGSN to the GGSN;
   assigning by the SGSN to the RNC the second TEID and a third ATM VCC for data transmission from the RNC to the SGSN; and
   assigning by the RNC to the SGSN a fourth ATM VCC for data transmission from the SGSN to the RNC.

3. The method of claim 2, wherein the MS transmits a first QoS to the SGSN when sending the packet data service request to the SGSN.

4. The method of claim 2, wherein the RNC transmits a second QoS and an IP address of the RNC to the SGSN when assigning the first TEID to the SGSN.

5. The method of claim 2, wherein the SGSN transmits a third QoS to the GGSN when assigning the first TEID and the first VCC to the GGSN.

6. The method of claim 2, wherein the GGSN transmits a fourth QoS to the SGSN when assigning the second TEID and the second VCC to the SGSN.

7. The method of claim 2, wherein the SGSN transmits a fifth QoS to the RNC when assigning the second TEID and the third VCC to the RNC.

8. The method of claim 2, wherein the RNC transmits a sixth QoS to the SGSN when assigning the fourth VCC to the SGSN.

9. The method of claim 2, wherein the TEIDs for data transmission from the RNC to the SGSN and from the SGSN to the GGSN are identical.

10. The method of claim 2, wherein the TEIDs for data transmission from the GGSN to the SGSN and from the SGSN to the RNC are identical.

11. The method of claim 2, wherein the first to fourth ATM VCCs are different.

12. A method of providing a packet data service upon request from an MS in a core network of a CDMA mobile communication system, comprising the steps of:
   assigning an identical uplink TEID and an identical downlink TEID to an RNC, an SGSN, and a GGSN in the core network;
   assigning different uplink and downlink VCCs to the RNC, the SGSN, and the GGSN;
   transmitting packet data from the RNC to the SGSN using the downlink TEID and a first downlink VCC for data transmission between the RNC and the SGSN;
   transmitting packet data from the SGSN to the GGSN using the downlink TEID and a second downlink VCC for data transmission between the SGSN and the GGSN;
   transmitting packet data from the GGSN to the SGSN using the uplink TEID and a first uplink VCC for data transmission between the GGSN and the SGSN; and
   transmitting packet data from the SGSN to the RNC using the uplink TEID and a second uplink VCC for data transmission between the SGSN and the RNC.

* * * * *